March 8, 1938.   W. G. HARDING   2,110,766
GYROCOMPASS
Filed June 14, 1935   2 Sheets-Sheet 1
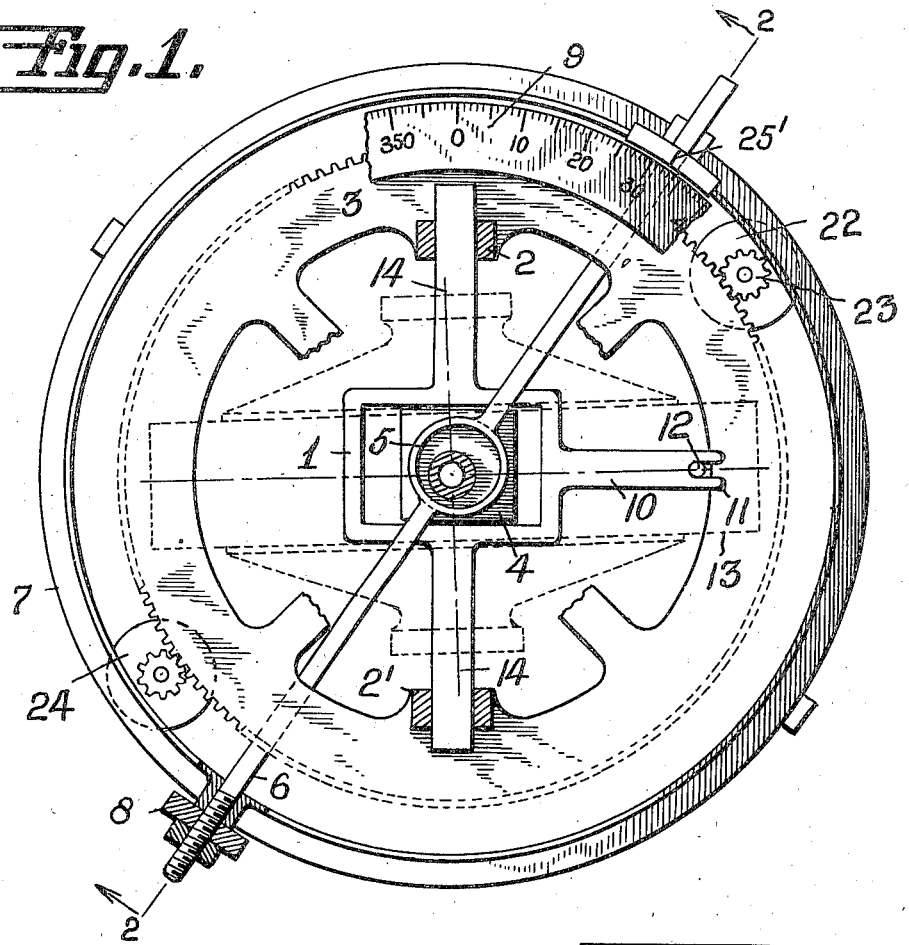
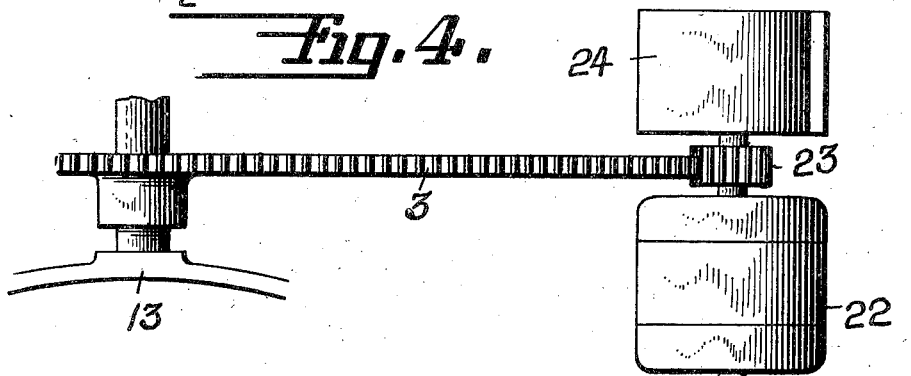
INVENTOR
WILLIAM G. HARDING
BY
Herbert H. Thompson
HIS ATTORNEY.

March 8, 1938. W. G. HARDING 2,110,766
GYROCOMPASS
Filed June 14, 1935 2 Sheets-Sheet 2
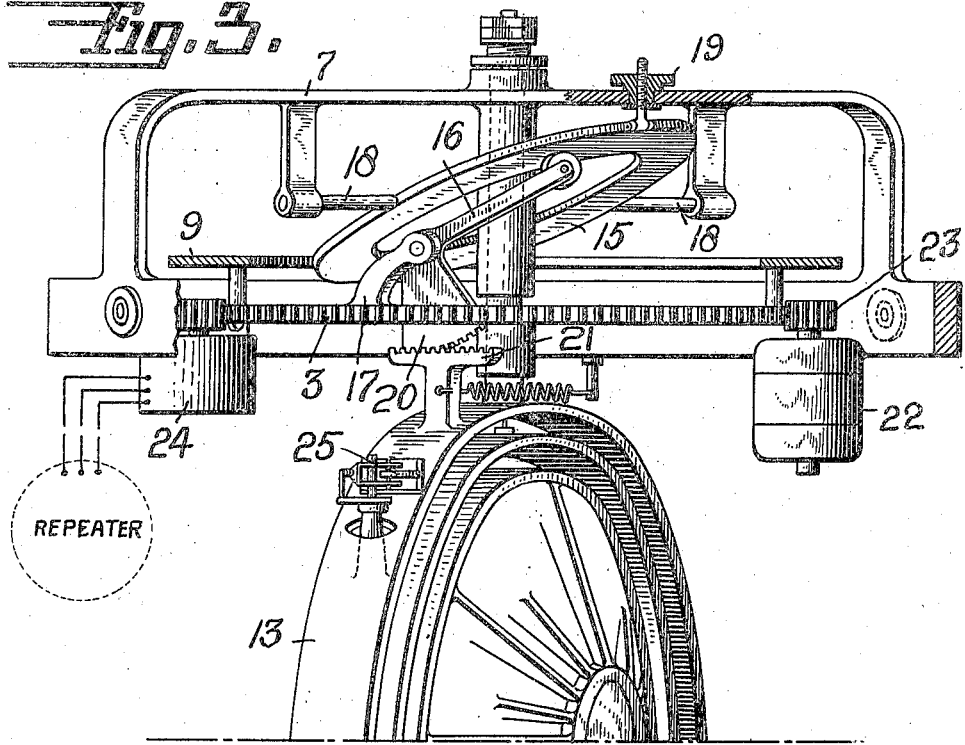
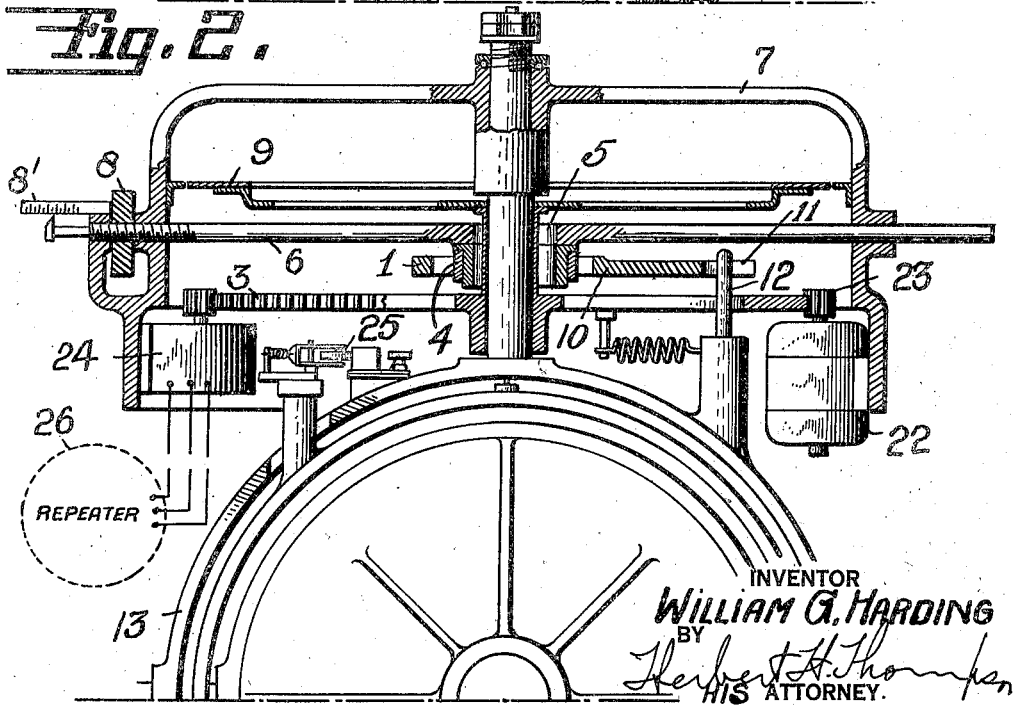
INVENTOR
WILLIAM G. HARDING
BY
HIS ATTORNEY.

Patented Mar. 8, 1938

2,110,766

UNITED STATES PATENT OFFICE 2,110,766

GYROCOMPASS

William George Harding, North Acton, London, England

Application June 14, 1935, Serial No. 26,565
In Great Britain June 22, 1934

7 Claims. (Cl. 33—226)

This invention relates to gyroscopic compasses, and particularly to means for correcting the readings of such compasses when they are carried on a moving vehicle such as a ship.

A gyro compass carried with the earth indicates the true north. This is because the supports of the compass experience a rotation about an axis parallel to the earth's axis. The gyro settles with its axis along the horizontal projection of this axis of rotation of its supports—the true north. If, however, the compass is mounted on a moving vehicle, such as a ship, the motion imparted to its supports is not the same as that of the surface of the earth in its vicinity, but is made up of this motion and of the motion of the ship over the earth's surface. The compass supports are therefore subjected to a total or resultant rotation in space about some axis which is, in general, different from the axis of rotation of the earth. The result is that the compass settles with its axis along the horizontal projection of this axis of total rotation, instead of pointing to the true north. The error measured in the horizontal plane is called the speed error.

The formula usually accepted for the speed error may be expressed in the form $$\tan E = \frac{-S \cos C}{V \cos L}$$

where

E is the speed error, or the angle measured clockwise from the true north to the gyro axis.

C is the course angle of the ship measured clockwise from the true north.

S is the speed of the ship over the earth's surface.

V is the component of the surface speed of the earth at the equator due to the earth's rotation about its axis once in a sidereal day, and L is the latitude of the ship.

Disregarding signs, and also the difference between an angle in radians and its tangent, the formula can be expressed in the numerical form Error in degrees = .0635 × knots × cos $C$ × sec $L$.

The present invention relates to means for correcting the readings of the compass to compensate for this speed error. The subject matter is similar to that disclosed in the specification of the prior Patent No. 1,255,480, but the present invention provides novel means for calculating and applying the correction.

To explain the differences between the present form and older forms of correction mechanism a general description of a well known form of gyro compass will be given.

The container for a gyro compass is called the binnacle; it serves the purpose of supporting the compass, and of securing it to the deck of the ship in a fixed relation to the fore and aft line of the ship. The binnacle supports, by means of a gimbal system, the main compass frame, or spider. The main compass frame in turn supports the rotatable part of the compass or inner element, which turns relative to the ship round the central vertical axis of the compass so as to remain pointing to the north or approximately so. Part of this inner element is the sensitive element which is constituted by the gyro, its casing, and the vertical ring supporting the casing in horizontal bearings on an east-west axis. The other parts of the inner element are the phantom element, the gravity control means or so called ballistic, the compass card, and the azimuth gear. The phantom element is driven by a motor 22 (see Fig. 2) to rotate with the sensitive element so as to keep step with it and follow its movements.

The essential function of the phantom element is to provide supports for the sensitive element, and/or for parts co-operating with it, such supports turning approximately in step with the sensitive element. In previous types of Sperry compasses the sensitive element, the ballistic or element applying the gravity control, and the follow-up contacts or other follow-up control device were supported on the phantom element. Hereinafter by the words "phantom element" is meant the unit carrying the follow-up contacts or their equivalent, together with all the parts constrained to turn with this unit. By the words "follow-up contacts", such as contacts 25 of Figs. 2 and 3, or their equivalent, is meant the electrical or other control device driven directly or indirectly by the azimuth motor which co-operates with the sensitive element to control the azimuth motor.

The azimuth gear is driven by the azimuth motor, which is located on the compass spider frame, and it, in turn, drives transmitters which actuate repeater compasses.

In previous Sperry compasses the phantom element, the azimuth gear, and the compass card have been fixed solidly together, so that the compass card and the azimuth gear kept step with the uncorrected compass, with the result that their motions relative to the ship were not equal to the changes in course of the ship. In these compasses corrections were applied by moving the lubber's mark, against which the ship's heading is read on the compass card, and by moving the transmitters bodily round the central axis of the compass, so that they transmitted the difference between this motion and the motion of the azimuth gear instead of simply the motion of the azimuth gear with respect to the compass frame. For this purpose the lubber's mark and the transmitters were mounted on a lubber ring which was displaced by the corrector mechanism on the compass frame round the central axis of the compass.

Two constructional arrangements of mechanism suitable for carrying the present invention into practical effect on a Sperry type compass are illustrated by way of example in the accompanying drawings and will now be described. In these drawings, Fig. 1 is a plan view of one of the constructional arrangements, some parts being broken away to expose others more clearly to view.

Fig. 2 is a part sectional view taken along line 2—2 of Fig. 1.

Fig. 3 is a sectional elevation of the other constructional arrangement, and

Fig. 4 is a detail showing a transmitter directly driven by the azimuth motor.

According to the present invention the compass card and the azimuth gear are not made solid with the phantom element, but the azimuth gear, to which the compass card may be attached or geared, is mounted so as to be capable of rotation with respect to the phantom element round the central axis of the compass, and a correction mechanism is used to produce angular displacement between the phantom element and the azimuth gear. The phantom element keeps step with the sensitive element as before through operation of follow-up contacts 25 and follow-up motor 22, but the azimuth gear is rotated relative to it so as to be free from the errors of the sensitive element. A north-south line on this gear or on a compass card attached to it therefore remains truly north and south in spite of speed errors of the sensitive element. The rotations of the azimuth motor are directly proportional to the change in the ship's heading, and transmitters 24, controlling repeaters 26 (see Figs. 2 and 3), may be driven from the azimuth gear or directly from the azimuth motor without the necessity of introducing any differential movement such as a bodily motion of the transmitters 24.

The possibility of driving directly from the azimuth motor, as shown in Fig. 4, is a considerable advantage as it permits of avoiding gearing the drive of the azimuth motor down to the speed of the azimuth gear and up again to the speed of the transmitters.

Similarly there is no need for a moving lubber's mark, so that a mark 25' (see Fig. 1) fixed to the main compass frame may be used for indicating the compass card reading. Alternatively a separate compass card geared to the azimuth gear may be used in conjunction with a fixed lubber's mark.

Referring first more particularly to Figs. 1 and 2, there is shown a slotted crosshead 1 mounted in slide bearings 2, 2' on the azimuth gear 3 and free only to slide in a north-south direction on this gear. In the slot of this crosshead is mounted a slide block 4 which is provided with a bearing into which is fitted a freely rotatable member 5 hereinafter called the eccentric.

The eccentric 5 is rigidly attached to a slide 6 which has its bearings fore and aft on the compass spider 7, which is directionally locked to the ship, this spider 7 being pivoted about axis A—A' on a gimbal system mounted in the binnacle. Means 8 are provided for adjusting the eccentric from concentricity with the vertical axis of the compass to maximum eccentricity in accordance with the requirements of speed of the ship and the local latitude.

The compass card 9 and azimuth gear 3 driven from follow-up motor 22 through pinion 23 can be considered as fixed in direction, and the ship as it changes course can be considered to rotate about this fixed member, and to carry the eccentric around with it. If the eccentric is in the concentric position no motion is imparted to the slide block 4, but if the eccentric is in any other position motion is imparted to the slide block 4 and in turn to the slotted crosshead 1. An extraneous arm 10 of the slotted crosshead projects outward away from the vertical axis of the compass; this arm is forked at 11 to engage with a drive pin 12 attached to the phantom ring 13, and as the crosshead arm moves in a north-south direction it causes the phantom ring to move through small angles relative to the azimuth gear 3. The angle turned through will depend on the ship's course and on the adjustment of the eccentric for ship's speed and local latitude. The member 8 for adjusting the eccentric will be provided with a scale 8' so that the correct setting can be given.

The angular movement given by this corrector mechanism to the phantom ring brings the normal to the plane of this ring into alignment with the gyro axis 14, 14, since the latter is displaced from the true north by the speed error angle and the former is displaced by the correction angle, and these two angles should be equal. If the angles are not equal, as, for example, if the wrong setting has been given to the eccentric adjustment, it might appear from the foregoing that the axis of the phantom ring would not be in alignment with the gyro axis; however, what would actually happen is that the azimuth gear would move to restore this alignment and the compass card would show an incorrect reading.

Although in the foregoing description of the particular mechanism it has been said that the crosshead is disposed north and south and that the eccentric slide 6 is fore and aft, it is not to be assumed that the mechanism is restricted by these statements, as any other directions for these slides might be used that make equal angles displaced from the positions indicated.

A number of modifications can be made in the mechanism so far described, for example,— In place of the eccentric, a cam may be used; or the slotted crosshead can be replaced by a slotted lever pivoted at or near the outer edge of the azimuth gear; again the movements of the crosshead or lever can be imparted to the phantom by means of slides, links, or gearing instead of by a slotted fork and pin.

Referring now to the second constructional arrangement as illustrated in Figure 2, it may be stated generally that the eccentric and crosshead arrangement of Figure 1 has been replaced by a tilting plate 15 mounted on the compass spider member 7, and a lever 16, 20, pivotally mounted on a bracket 17 which is fixed on the azimuth gear 3.

The tilting plate 15 can be adjusted relative to the spider about an axis 18, 18, from a zero position in which it is parallel with the azimuth gear 3 to any angle required. Means such as 19 for adjusting this plate are provided and are fitted with a scale for setting the angle of tilt of the plate to suit the condition of speed and local latitude of the ship.

The roller arm 16 of the pivoted lever 16, 20, is constrained to follow the cam face of the tilting plate by means of a spring or other suitable device such as a secondary cam face below the roller. The other arm of the lever, shown as the geared quadrant 20, engages with a rack 21 on the phantom ring 13 and by this means moves the phantom ring through angular distances corresponding to the rise and fall of the roller, as the ship changes course.

The geared quadrant 20 and rack 21 can be replaced by any means which will give a suitable linkage between the roller arm 16 and the phantom ring 13.

What I claim is:—

1. A gyro-compass and repeater system comprising a main gyro-compass and an azimuth motor, said compass comprising a sensitive element, a follow-up element, an azimuth gear driven from said azimuth motor and connected for driving said follow-up element, said azimuth gear being adjustable with respect to said follow-up element, a correction device connecting said gear and follow-up element, a control device operated by relative displacement of said elements for controlling said azimuth motor, and a transmitter also driven by said azimuth motor.

2. A gyro-compass and repeater system comprising a main gyro-compass, a transmitter, an azimuth motor, an azimuth gear driven by said motor, means whereby said transmitter is driven directly by the azimuth motor, said compass comprising a sensitive element, a follow-up element driven from said azimuth motor through said azimuth gear, a control device operated by relative displacement of said elements for controlling said motor, a compass card carried by the azimuth gear, and a correction device adjustably connecting said azimuth gear and follow-up element for effecting relative displacement between the azimuth gear and the follow-up element as the ship changes course.

3. A gyro-compass comprising a sensitive element, a follow-up element which follows the sensitive element, an azimuth gear connected for driving said follow-up element, a control device operated by relative displacement of said elements, an azimuth motor controlled by said device and geared to said azimuth gear for driving the latter, and means connecting said gear and follow-up element for effecting angular displacement between said gear and said follow-up element so that said gear shall be free from ship's speed error possessed by the sensitive element and follow-up element, said connecting means including a variable eccentric and means for setting the same in accordance with the ship's speed and latitude from the part of the compass that moves in azimuth with the ship as it changes course.

4. A gyro-compass comprising a sensitive element, a follow-up element which follows the sensitive element, an azimuth gear, a control device operated by relative displacement of said elements, an azimuth motor controlled by said device and geared to said azimuth gear for driving the latter and said follow-up element, and correction means connecting said gear and follow-up element for effecting angular displacement between said gear and said follow-up element so that said gear shall be free from ship's speed error possessed by the sensitive element, said correction means comprising an element non-rotatably mounted on said gear and connected to said follow-up element but slidably mounted in the N-S direction, a block slidably mounted in said element in a generally E-W direction, an eccentric cam on said block, and means for adjusting said cam to vary the eccentricity effective on said block and element in accordance with the speed and latitude of the ship.

5. A gyro-compass comprising a sensitive element, a follow-up element which follows the sensitive element, an azimuth gear, a control device operated by relative displacement of said elements, an azimuth motor controlled by said device and geared to said azimuth gear for driving the latter, and means connecting said gear and follow-up element for effecting angular displacement between said gear and said follow-up element so that said gear shall be free from ship's speed error possessed by the sensitive element, said means including a variably tiltable plate mounted above said gear and movable in azimuth with the ship, and means for adjusting the angle of said plate from the part of the compass that moves with the ship as it changes course.

6. A gyro-compass and repeater system comprising a main gyro-compass, a transmitter, a repeater, an azimuth motor, an azimuth gear driven therefrom, means interconnecting said transmitter, said repeater, said azimuth motor and said azimuth gear so that these all turn proportionately, said compass comprising a sensitive element, a follow-up element, a control device operated by relative displacement of said elements for controlling said motor, and a correction device adjustably connecting said azimuth gear and follow-up element for automatically changing the relative displacement between the azimuth gear and the follow-up element as the ship changes course.

7. A gyro-compass comprising a sensitive element, a follow-up element which supports and which follows the sensitive element, an azimuth gear for driving said follow-up element, a control device operated by relative movement of said elements, an azimuth motor controlled by said device and geared to said azimuth gear for driving the latter, and manually settable means connecting said gear and follow-up element for effecting angular displacement between said gear and said follow-up element so that said gear shall be free from ship's speed error possessed by the sensitive element.

WILLIAM GEORGE HARDING.